(12) United States Patent
Satran et al.

(10) Patent No.: US 8,856,443 B2
(45) Date of Patent: Oct. 7, 2014

(54) AVOIDING DUPLICATION OF DATA UNITS IN A CACHE MEMORY OF A STORAGE SYSTEM

(75) Inventors: Julian Satran, Omer (IL); Israel Gold, Haifa (IL); Efraim Zeidner, Haifa (IL); Yechiel Yochai, Moshav Aviel (IL); Sivan Tal, Kibbutz Sarid (IL)

(73) Assignee: Infinidat Ltd., Herzliya (IL)

( * ) Notice: Subject to any disclaimer, the term of this patent is extended or adjusted under 35 U.S.C. 154(b) by 142 days.

(21) Appl. No.: 13/417,342

(22) Filed: Mar. 12, 2012

(65) Prior Publication Data
US 2013/0238855 A1 Sep. 12, 2013

(51) Int. Cl.
G06F 12/00 (2006.01)
(52) U.S. Cl.
USPC .................. 711/118; 711/E12.017
(58) Field of Classification Search
USPC .......................... 711/118, E12.017
See application file for complete search history.

(56) References Cited

U.S. PATENT DOCUMENTS

| | | | |
|---|---|---|---|
| 8,001,085 B1* | 8/2011 | Kiselev | 707/639 |
| 2009/0063528 A1 | 3/2009 | Yueh | |
| 2009/0172286 A1* | 7/2009 | Lasser et al. | 711/127 |
| 2010/0070715 A1 | 3/2010 | Waltermann et al. | |
| 2011/0202722 A1 | 8/2011 | Satran et al. | |
| 2013/0124794 A1* | 5/2013 | Bux et al. | 711/103 |

* cited by examiner

Primary Examiner — Mardochee Chery
(74) Attorney, Agent, or Firm — Oren Reches (57) ABSTRACT

According to the teaching disclosed herein there is provided at least a method, system and device for managing a cache memory of a storage system. The storage system is associated with at least one physical storage device and, responsive to a read request, comprising information indicative of a logical address of at least one requested data unit, to obtain a storage physical address associated with the logical address, search the cache memory for a data unit associated with the storage physical address and service the request from the cache in case the data unit is found in the cache memory.

26 Claims, 4 Drawing Sheets

AVOIDING DUPLICATION OF DATA UNITS IN A CACHE MEMORY OF A STORAGE SYSTEM

FIELD OF THE PRESENTLY DISCLOSED SUBJECT MATTER

The presently disclosed subject matter relates to the field of memory resources management in a storage system.

BACKGROUND

The growing complexity of computer storage systems infrastructure requires solutions for efficient use and management of resources. Storage virtualization is commonly used in storage systems in order to obtain greater flexibility and enable a more efficient use of the storage system. The use of a virtualized storage system enables to present to the user a logical space for data storage while the storage system itself handles the process of mapping it to the actual physical location. For example, block-based virtualization is based on the idea of logical addresses and enables to store and retrieve data in terms of Logical block addresses (LBAs), which are independent of the actual physical addresses in which the data is stored.

Nowadays, certain virtualized storage systems implement data de-duplication. Data de-duplication is a technique directed for optimizing the efficiency of utilization of available storage space in a storage system. In the de-duplication process, a single copy of a data unit is stored in the physical storage, while duplications of identical data units are eliminated and only a virtual representation of these units is maintained. By storing a single copy of each data unit, de-duplication enables to reduce the required storage space of a physical storage.

Storage systems also commonly include a cache memory used to buffer write requests issued by hosts connected to the storage system, as well as to store read data in order to enable faster data retrieval time in future read requests.

US Patent Application No. US20070864756 discloses a data de-duplication application which uses this principle for de-duplication of redundant data on the primary storage read/write pathway of a virtualized server environment. The de-duplication application identifies redundant data in memory (e.g., RAM, cache memory), storage, or both, and replaces the redundant data with one or more pointers pointing to a single copy of the data. According to US20070864756 the same de-duplication method is applied to both the main storage devices and to the cache memory. The method is based on the examination of the contents of data portions (by generating a single value, such as a hash value) and identifying identical data portions.

However, US20070864756 ignores the substantial difference in the rate of change of data, which exists between physical storage devices and cache memory. The rate of change in the cache memory is much faster than in the physical storage device, to the extent that it hinders a realistic implementation of the suggested method for finding duplicates in the cache memory.

Publications considered to be relevant as background to the presently disclosed subject matter are listed below. Acknowledgement of the references herein is not to be inferred as meaning that these are in any way relevant to the patentability of the presently disclosed subject matter.

US Patent application, Pub No. US2010070715 discloses an apparatus, system, and method for de-duplicating storage cache data. A storage cache partition table has at least one entry associating a specified storage address range with one or more specified storage partitions. A de-duplication module creates an entry in the storage cache partition table wherein the specified storage partitions contain identical data to one another within the specified storage address range thus requiring only one copy of the identical data to be cached in a storage cache. A read module accepts a storage address within a storage partition of a storage subsystem, to locate an entry wherein the specified storage address range contains the storage address, and to determine whether the storage partition is among the one or more specified storage partitions if such an entry is found.

SUMMARY

According to an aspect of the presently disclosed subject matter there is provided a method of managing a cache memory of a storage system, the cache memory being operable to store data units, the method comprising: receiving a read request, the read request comprising information indicative of a logical address of at least one requested data unit; obtaining a storage physical address associated with the logical address; searching the cache memory for a data unit associated with the storage physical address; and servicing the request from the cache in case the data unit is found in the cache memory.

According to certain embodiments of the presently disclosed subject matter, the method further comprising: prior to the obtaining, searching the cache memory for a data unit associated with the logical address and wherein the obtaining and searching are performed in case the data unit is not found.

According to certain embodiments of the presently disclosed subject matter, the method according further comprising: retrieving the requested data unit from the physical storage device, in case the data unit is not found in the cache memory; storing the requested data unit in the cache memory; and updating the cache memory, to include information indicative that the requested data unit is stored in the cache memory, the information providing at least a link between the requested data unit and a respective storage physical address.

According to another aspect of the presently disclosed subject matter there is provided A storage system comprising: a control layer operatively connected to a physical storage space including at least one storage device; the control layer comprising a cache memory operable to store data units characterized by respective physical addresses and logical address, the control layer is operable to receive a read request, the read request comprising information indicative of a logical address of at least one requested data unit; the control layer is further operable to obtain a storage physical address associated with the logical address; search the cache memory for a data unit associated with the storage physical address; and service the request from the cache in case the data unit is found in the cache memory.

According to certain embodiments of the presently disclosed subject matter, the control layer is further operable, prior to obtaining a storage physical address associated with the logical address, to search the cache memory for a data unit associated with the logical address and in case the data unit is not found to perform the obtaining and searching.

According to certain embodiments of the presently disclosed subject matter, the control layer is further operable to retrieve the requested data unit from the physical storage device, in case the data unit is not found in the cache memory; store the requested data unit in the cache memory; and update the cache memory, to include information indicative that the requested data unit is stored in the cache memory, the information providing at least a link between the requested data unit and a respective storage physical address.

According to another aspect of the presently disclosed subject matter there is provided a non-transitory computer readable medium storing a computer readable program executable by a computer for causing the computer to perform a process of managing a cache memory of a storage system, the cache memory being operable to store data units, the storage system being associated with at least one physical storage device, the method comprising: receiving a read request, the read request comprising information indicative of a logical address of at least one requested data unit; obtaining a storage physical address associated with the logical address; searching the cache memory for a data unit associated with the storage physical address; and servicing the request from the cache in case the data unit is found in the cache memory.

According to a further aspect of the presently disclosed subject matter there is provided a cache manager implemented on a non-transitory computer memory, operatively connectable to a storage system, the storage system comprising a cache memory operable to store data units, the cache manager is operable to: receive information indicative of a logical address of at least one requested data unit; receive data indicative of a storage physical address associated with the logical address; search the cache memory for a data unit associated with the storage physical address; and provide the at least one requested data unit from the cache in case the data unit is found in the cache memory.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the drawings and descriptions set forth, identical reference numerals indicate those components that are common to different embodiments or configurations. Unless specifically stated otherwise, as apparent from the following discussions, it is appreciated that throughout the specification discussions utilizing terms such as "receiving", "obtaining", "searching", "servicing", "providing" or the like, refer to the action and/or processes of a computer that manipulate and/or transform data into other data, said data represented as physical quantities, e.g. such as electronic quantities, and/or said data representing the physical objects. The term "computer" as used herein should be expansively construed to cover any kind of electronic device with data processing capabilities.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment (s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
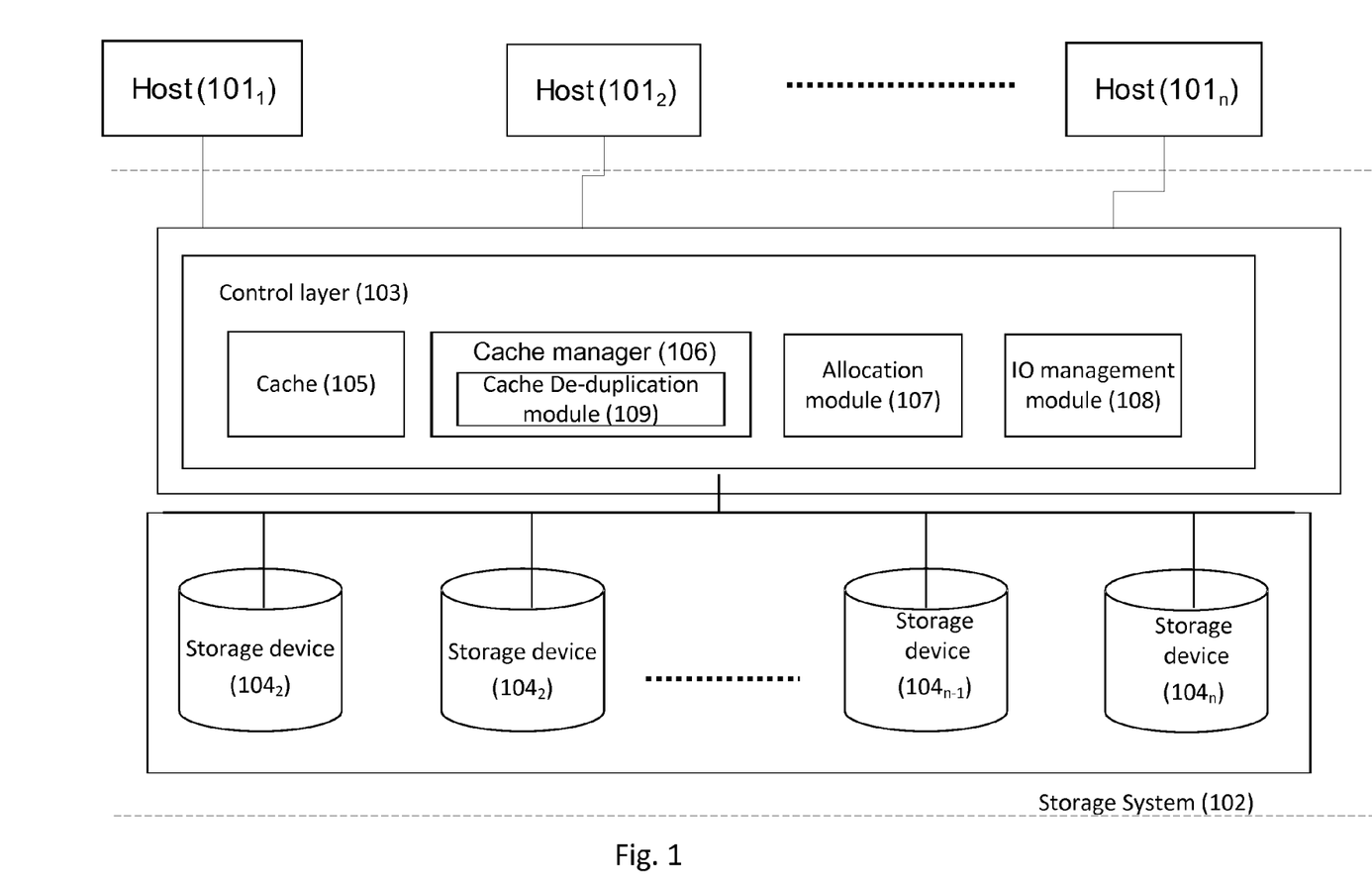
FIG. 1 is a functional block diagram schematically illustrating a computer storage system, according to the presently disclosed subject matter.
Figure 3:
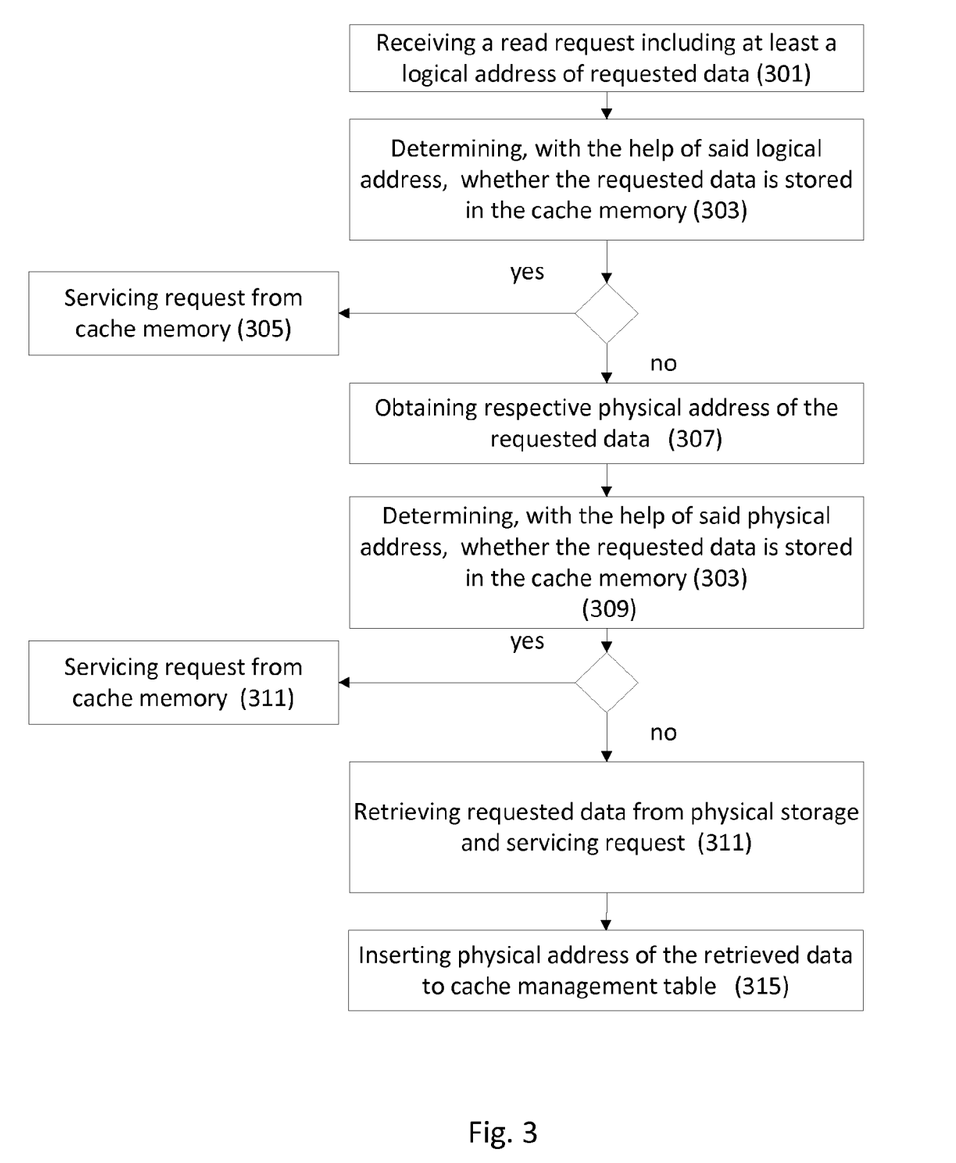
FIG. 3 is an example of a cache allocation table, in accordance with the presently disclosed subject matter.

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIG. 1 illustrates a general schematic of the system architecture in accordance with an embodiment of the presently disclosed subject matter. Modules in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

As mentioned above, computer systems are configured with a cache memory in order to improve their performance. Though a cache memory has much less storage capacity than the main computer storage devices (e.g. disks), frequently accessed data is stored in the cache memory, which enables faster data retrieval than data retrieval from the main computer storage devices. As further mentioned above, computer storage systems often implement at least one virtual storage layer providing virtual representation of the physical storage and provide data to hosts in terms of the virtual (or logical) address of the data rather than the physical address.

According to the known art, such computer storage systems are configured to identify and index data, stored in the cache memory, based on the logical address of the data, as presented to a host. When a read request is initiated, requesting to retrieve data, the requested data is first searched in the cache memory based on the logical address of the data, which is provided as part of the read request. However, in computer storage systems which implement virtual storage layers, a single data unit, stored in the physical storage, can be represented in a virtual storage by a number of different respective logical data addresses, each address corresponding to a different logical data unit. Accordingly, if a requested data unit is identified by its logical address, it will not be found in the cache memory, even if the corresponding data exists in the cache, if it is identified in the cache memory by a logical address which is different than the logical address in the read request. In such cases, the requested data, although present in the cache memory, is retrieved from the physical data storage, copied to the cache memory and provided to the host. This process, in addition to being a slower data retrieval process, also creates duplicate copies of data in the cache memory and thereby reduces the storage capacity of the cache memory.

The teaching disclosed herein includes at least a method, system and module for enabling avoiding duplicates of data units in a cache memory which overcome the shortcomings mentioned above. Data which is stored in the cache memory can be identified and indexed based on both its logical address in the virtual memory and its physical address in the physical data storage device $104_{1-n}$ (referred to herein also as "storage physical address"). Thus, in response to a read request, data can be searched in the cache memory based on both of these addresses. This enables identifying data which is stored in the cache memory even if the read request identifies the requested data by a logical address which is different than the logical address associated with the data in the cache memory.

One example of a common scenario that demonstrates the advantages of avoiding cache duplicates as disclosed herein, is in the field of computer virtualization. For instance in virtualized server environments (e.g. based on VMware technology), multiple virtual servers are deployed from an identical or similar disk image. Each virtual server is run in a virtualized environment and is associated with a virtual volume which is used as a "system disk". Deployment of a virtual server can be done for example by cloning a "master image" volume, typically using snapshot operation on the volume at the storage system, and running the virtualized software on the clone. In such environments, there are multiple virtual servers running on top of similar storage volumes that are clones of one another or have a common origin source volume. Since different servers are associated with different volumes, each using a different logical address, a naive caching mechanism in the storage system, that only uses the logical address to index the cache, would create a lot of duplicates in the cache.

Another scenario that can benefit from the advantages of avoiding cache duplicates as disclosed herein can result from the operation of a known de-duplication method executed on data stored in the physical data storage. As disclosed above, in a de-duplication process, a single copy of a data unit is stored in the physical storage, while duplications of identical data units are eliminated and only a virtual representation of these units is maintained. Thus, as a result of de-duplication, a single copy of a data unit stored on a disk can be linked to two different logical addresses, (e.g. each address corresponding to a different logical volume allocated to a different host).

The presently disclosed subject matter enables to eliminate data duplicates in cache memory, which may result from the above or other scenarios, effectively extending the capacity of the cache in the storage system.

Attention is drawn to FIG. 1, which shows a functional block diagram schematically illustrating a computer storage system, according to the presently disclosed subject matter. FIG. 1 depicts one or more host computers $101_{1-n}$ illustrated as sharing common storage means provided by a virtualized storage system 102. A host ($104_{1-n}$) can be for example a workstation, an external server, a group of servers, a port in a server, a laptop or personal computer, etc.

The storage system comprises a storage control layer 103 with one or more appropriate storage control devices operatively coupled to the plurality of host computers $104_{1-n}$ and to a plurality of data storage devices $104_{1-n}$ constituting a physical storage space optionally distributed over one or more storage nodes. The storage control layer 103 is operable to perform control operations including input/output (I/O) operations between hosts $101_{1-n}$ and data storage devices $104_{1-n}$. Connection between host computers $101_{1-n}$ and storage system 102 can be a direct connection and/or it may be established over a communication network. Data storage devices $104_{1-n}$ are adapted for storing a plurality of data units. In some cases control layer 103 and data storage devices $104_{1-n}$ can be consolidated in a system located at the same location, while in other cases part or all of data storage devices $104_{1-n}$ can be located at one or more remote location and communicate with control layer 103 over some type of remote communication network. Data storage devices $104_{1-n}$ are adapted for storing a plurality of data units. Control layer 103 can also comprise or be otherwise associated with one or more processors configured, inter alia, to manage and control relevant components and operations, and to perform tasks in response to instructions.

The storage control layer 103 is further operable to handle a virtual representation of physical storage space (i.e. virtual address space) and to facilitate necessary mapping between the physical storage space and its virtual representation (i.e. a logical storage space). Control layer 103 is configured to create and manage at least one virtualization layer interfacing between elements of the computer system (host computers, etc.) external to the storage system and the physical storage space. The virtualization functions may be provided in hardware, software, firmware or any suitable combination thereof. Optionally, a format of logical representation provided by control layer 103 may differ, depending on interfacing applications.

Optionally, the functions of control layer 103 may be fully or partly integrated with one or more host computers and/or storage devices and/or with one or more communication devices enabling communication between the hosts and the storage devices.

The physical storage space may comprise any appropriate permanent storage medium and may include, by way of non-limiting example, one or more disk units (DUs), also called "disk enclosures", comprising several disk drives (disks). The physical storage space comprises a plurality of data blocks, each data block may be characterized by a pair ($DD_{id}$, DBA) where $DD_{id}$ is a serial number associated with the disk drive accommodating the data block, and DBA is a logical block number within the respective disk. The storage control layer 103 and storage devices $104_{1-n}$ may communicate with host computers $101_{1-n}$ and within the storage system in accordance with any appropriate storage protocol.

Data stored in the physical storage space may be logically represented to a client (host) in terms of logical objects within a logical storage space. Depending on the storage protocol, the logical objects may be logical volumes, data files, multi-media files, snapshots and other copies, etc.

The entire address space of the storage system is divided into logical volumes, and each logical volume becomes an addressable device. A logical volume (LV) or logical unit (LU) represents a plurality of data blocks characterized by successive Logical Block Addresses (LBA). Different logical volumes may comprise different numbers of data blocks, which are typically of equal size within a given system (e.g. 512 bytes).

Blocks with successive LBAs can be grouped into portions that act as basic data units for data handling and organization within the system. Thus, by way of non-limiting example, whenever space has to be allocated on a disk drive or on a memory component in order to store data, this allocation can be done in terms of data portions. Data portions are typically, although not necessarily, of equal size throughout the system (by way of non-limiting example, data portions can be sections of 64 Kbytes). In the following discussion the term "data unit" is used as a general non-limiting term, which should be construed to include any size of data.

Storage control layer 103 can be further configured to facilitate various protection schemes. By way of non-limiting example, data storage formats, such as Redundant Array of Independent Disks (RAID), can be employed to protect data from internal component failures by making copies of data and rebuilding lost or damaged data. Different RAID schemes implement different protection schemes. For example, RAID 1 implements mirroring without parity and RAID 5 and 6 implement one and two parity portions, respectively.

Typically, definition of LUs in the storage system involves in-advance configuring of an allocation scheme and/or allocation function used to determine the location of the various data portions (and their associated parity portions) across the physical storage medium. The allocation scheme can be handled for example, by an allocation module 107 being a part of the storage control layer 103. The location of various data portions allocated across the physical storage can be recorded and monitored with the help of one or more allocation tables linking between logical data addresses and their corresponding allocated location in the physical storage.

The storage control layer can further comprise a cache memory 105 operable as part of the I/O flow in the system, a cache control module (aka cache manager) 106, operable to control data activity in the cache and an I/O management module 108 for receiving and handling commands (including I/O commands) and enabling execution of the respective operations.

Elements within control layer 103 can be implemented as centralized modules operatively connected to the plurality of storage control devices or can be distributed over a part or all storage control devices. Logical contiguity of successive portions and physical contiguity of the storage location allocated to the portions in the system are not necessarily correlated.

In accordance with the presently disclosed subject matter, cache manager 106 can comprise or be otherwise associated with a cache de-duplication module 109 operable to avoid duplicates of identical data units in cache 105.

A request, initiated, for instance, by a host, is received by I/O management module 108 (which can be configured for example, as part of the port layer), which is operable to identify and process the request. A read request for example is transmitted to cache manager 106 which is operable to determine whether the requested data is present in cache 105.

In a read request the requested data is identified by a logical address of the requested data and data offset (including for example, LUN, LBA, block count). As mentioned above, data handling in storage system 102 is performed by data units of a predefined size (e.g. data sections of 64 k). Accordingly, in case the size of the data specified in a read request is greater than a section, it can be divided (e.g. with the help of I/O management module 108) into sub-requests each corresponding to data of a size which is equal or less than one section.

Cache manager 106 can be operable to manage (e.g. with the help of cache de-duplication module 109) a data structure (herein "cache mapping table") directed for mapping information indicative of the data which is currently stored in cache memory 105. This information is referred to herein as "mapping data". For example, data units stored in cache memory 105 can be linked in the cache mapping table with respective address keys which enable to locate requested data units based on their addresses, and access and retrieve the data units.

Commonly, the atomic unit for data handling in the cache is a page, having a size of 4 Kilobytes (K). A page comprises 8 data blocks (512 Bytes each). Pages are consecutive and aligned (per their Logical address). 16 pages form a section (having a size of 64 K). Given the request, in order to search for the requested data in cache 105, cache manager 106 can be operable to determine what is the first page within the section in the request, the first block within the page, and the block count for the request.

Figure 2:
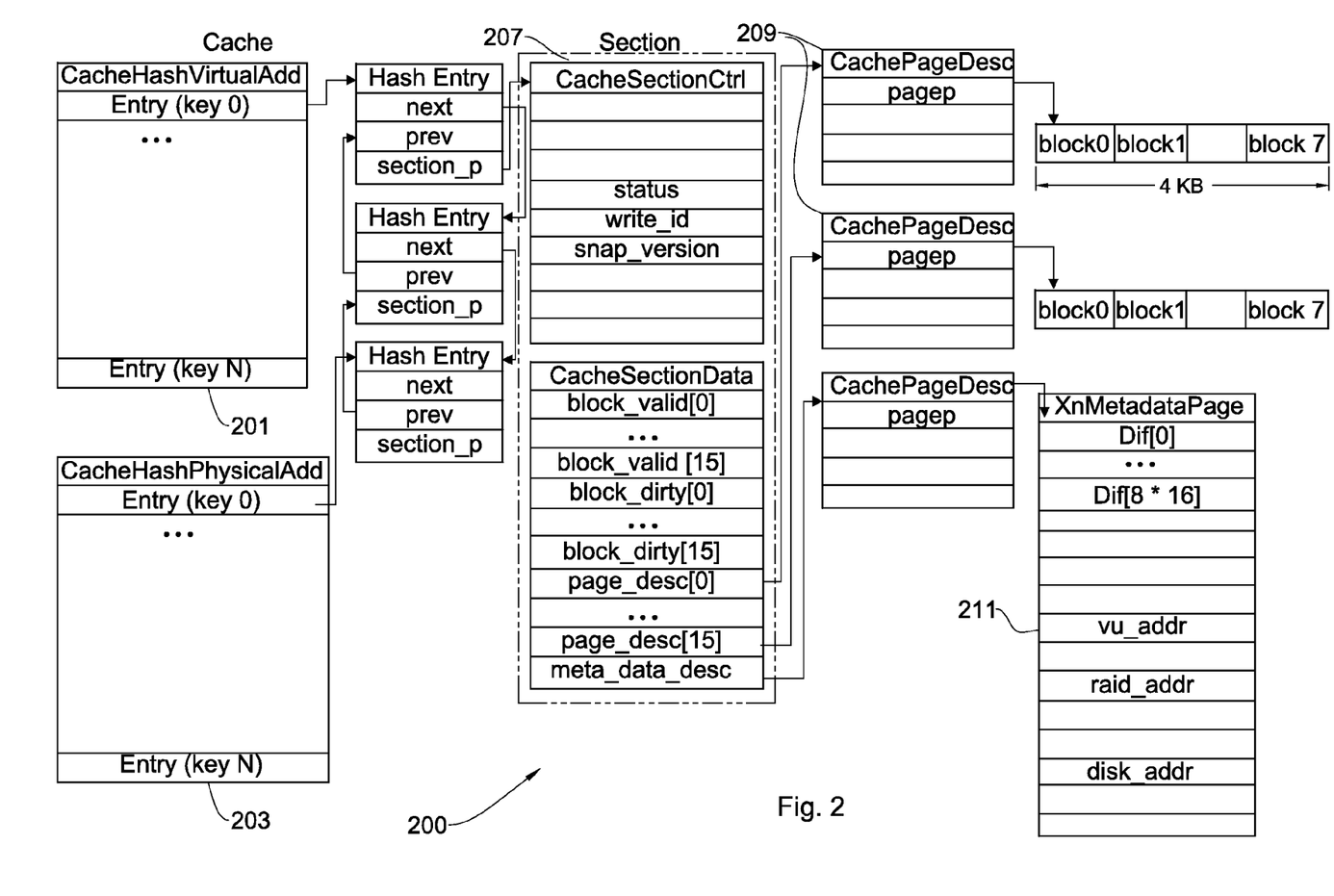
FIG. 2 is a flowchart illustrating a sequence of operations carried out for avoiding cache duplicates, in accordance with the presently disclosed subject matter.

FIG. 2 is an example of a cache mapping table 200, in accordance with the presently disclosed subject matter. It should be noted that FIG. 2 shows a partial view of the actual cache mapping table and includes only the relevant elements. FIG. 2 shows a non-limiting example of a cache mapping table configured in the form of a hash table, while other data structures such as trees, linked list or arrays can be used as well. In cache mapping table 200 each section is linked to a metadata page, which holds pointers to a logical address within the cache, and to 16 page descriptors for each page in the section. Note, for example section 207 in FIG. 2 is linked to metadata page 211 and to 16 page descriptors (207).

According to the presently disclosed subject matter the mapping data in mapping table 200 can be made accessible, based on the respective logical and physical addresses of the respective data units. For example, two types of keys can be used for searching for entries of respective data sections in mapping table 200. The first key is a logical address key which corresponds to the logical address of the requested data unit (CacheHashvirtualAdd (201) in mapping table 200). Given a logical address, cache manager 106 is operable to search mapping table 200 for a corresponding logical address key, which is linked to an entry storing the requested data unit. In case the data is found in the cache, it can be retrieved from the cache and provided to a requesting entity without accessing and retrieving the data from the physical storage.

In addition, according to the presently disclosed subject matter, mapping data in mapping table 200 can be accessed with the help of a second type of key, a physical address key, which corresponds to the storage physical address of the requested data (CacheHashPhyicalAdd (203) in mapping table 200). This novel configuration of the cache mapping table enables cache manager 106 to search for requested data based on the logical address provided with the read request as well as the respective physical address, as explained below.

In the metadata page 211, both the logical address (e.g. vu_addr & vd_addr fields in mapping table 200) and the physical address (e.g. raid_addr field in mapping table 200) are stored. The physical address keys 203 which are added to table 200 enable accessing the information with respect to the physical address of the data units and thereby facilitate searching for data units in the cache memory based on this information.

FIG. 3 is a flowchart illustrating an example of a sequence of operations carried out for avoiding cache duplicates, in accordance with the presently disclosed subject matter. Operations in FIG. 3 are demonstrated with reference to system components illustrated in FIG. 1, however, this is done by way of example only and should not be construed as limiting in any way. FIG. 3 demonstrates a non-limiting example of utilizing the physical address (in the physical storage) for the purpose of locating data in the cache after failing to find the data with the help of the respective logical address.

At block 301 a read request is received. A read request is received at cache manager 106 and can be initiated for example by a host. In response to a read request, cache manager 106 is operable to process the request and extract the logical address of the requested data from the read request and search for the requested data in cache memory 105.

To this end, cache manager 106 in cache, is operable to search the cache management table in order to determine whether the requested data is found in the cache memory (block 303). Cache manager 106 can be operable to search for a logical address key in table 200 which matches the logical address retrieved from the read request. Even in case a respective address key is found, it is not always true that the requested data is actually found in cache 105.

A cache miss can occur, for example, in one of the following cases:
- a key corresponding to the logical address of the requested data is not found in the cache mapping table.
- a key corresponding to the logical address of the requested data is found in the cache mapping table, however the key is not associated with a respective entry.
- the corresponding key is found in the cache mapping table as well as a respective entry, however the pointer to the metadata page of the requested section is missing or invalid.
- the corresponding key is found in the cache mapping table as well as a respective entry and a pointer to the metadata page, however the section descriptor is missing or invalid.

In case the requested data is found in cache 105 a cache hit is established. In such case, cache manager 106 is operable to service the request by retrieving the data directly from cache 105 (block 305). If the requested data is not in found in cache 105 a cache miss is established.

As explained above, according to the presently disclosed subject matter, cached data units can be accessed and retrieved from cache 105, based on their respective storage physical address. Optionally although not exclusively, this ability can be exploited in case of a logical cache miss. While in known computer systems, in response to a logical cache miss, the data is retrieved from the physical storage (e.g. disks) into the cache memory, and from there it is transferred back to the requesting host, according to the presently disclosed subject matter, in response to a logical cache miss, cache manager 106 is operable to retrieve the respective storage physical address of the requested data (block 307) and to use the storage physical address for searching again in cache management table 200 for the requested data.

To this end, cache de-duplication module 109 can be operable to issue a request to allocation module 107 (which can be for example a RAID manager in a storage system implementing RAID), which, as mentioned above, manages one or more allocation tables linking between logical data addresses and their corresponding allocated physical addresses in the physical storage. The request issued by cache manager 106 includes data indicative of the logical address of the requested data. In response to the request, allocation module 107 can be operable to retrieve the respective physical address of the logical address in the request and send to cache manager 106 data indicative of the retrieved physical address.

Once the respective storage physical address is obtained, cache de-duplication module 109 can be operable to search again for the requested data in cache mapping table 200, this time searching for a physical address key which match the storage physical address of the requested data. In case a physical address key associated with the physical address is found along with the respective entry and the additional information indicating a valid location of the requested data in cache memory 105, a (physical) cache hit is established. In such case, cache manager 106 can service the request by retrieving the data directly from cache 105 (block 311). Otherwise, a (physical) cache miss is established and the requested data is read from the physical storage (e.g. disks) into cache 105, and from the cache memory it is transferred back to the requesting entity (block 313).

In addition, according to the presently disclosed subject matter, once new data is stored in cache memory, cache de-duplication module 109 can be operable to update cache management table 200 to include a new logical address key corresponding to the logical address of the new data and a new physical address key corresponding to the physical address of the new data (block 315). This action enables to locate the new data based on its logical address and/or its physical address in the physical storage.

Figure 4:
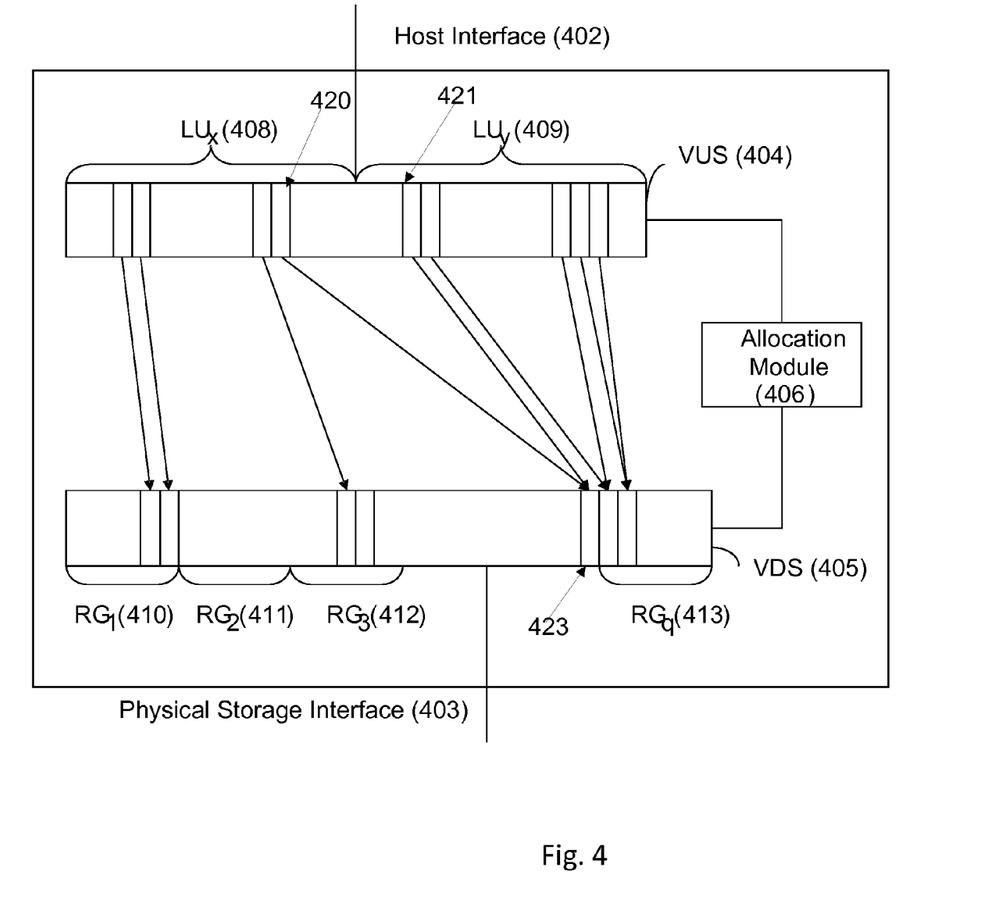
FIG. 4 is a schematic functional diagram of a control layer configured according to the presently disclosed subject matter.

Referring to FIG. 4, there is illustrated a schematic functional diagram of a control layer configured according to the presently disclosed subject matter. The illustrated configuration is further detailed in U.S. patent application Ser. No. 13/008,197 filed on Jan. 18, 2011 assigned to the assignee of the present invention and incorporated herein by reference in its entirety.

The virtual presentation of the entire physical storage space can be provided through creation and management of at least two interconnected virtualization layers: a first virtual layer 404 interfacing via a host interface 402 with elements of the computer system (host computers, etc.) external to the storage system, and a second virtual layer 405 interfacing with the physical storage space via a physical storage interface 403. The first virtual layer 404 is operative to represent logical units available to clients (workstations, applications servers, etc.) and is characterized by a Virtual Unit Space (VUS). The logical units are represented in VUS as virtual data blocks characterized by virtual unit addresses (VUAs). The second virtual layer 405 is operative to represent the physical storage space available to the clients and is characterized by a Virtual Disk Space (VDS). By way of non-limiting example, storage space available for clients can be calculated as the entire physical storage space less reserved parity space and less spare storage space. The virtual data blocks are represented in VDS with the help of virtual disk addresses (VDAs). Virtual disk addresses are substantially statically mapped into addresses in the physical storage space. This mapping can be changed responsive to modifications of physical configuration of the storage system (e.g. by disk failure of disk addition). The VDS can be further configured as a concatenation of representations (illustrated as 410-413) of RAID groups.

The first virtual layer (VUS) and the second virtual layer (VDS) are interconnected, and addresses in VUS can be dynamically mapped into addresses in VDS. The translation can be provided with the help of the allocation module 406 operative to provide translation from VUA to VDA via Virtual Address Mapping. By way of non-limiting example, the Virtual Address Mapping can be provided with the help of an address trie detailed in U.S. application Ser. No. 12/897,119 filed Oct. 4, 2010, assigned to the assignee of the present application and incorporated herein by reference in its entirety.

By way of non-limiting example, FIG. 4 illustrates a part of the storage control layer corresponding to two LUs illustrated as LUx (408) and LUy (409). The LUs are mapped into the VUS. In a typical case, initially the storage system assigns to a LU contiguous addresses (VUAs) in VUS. However, existing LUs can be enlarged, reduced or deleted, and some new ones can be defined during the lifetime of the system. Accordingly, the range of contiguous data blocks associated with the LU can correspond to non-contiguous data blocks assigned in the VUS. The parameters defining the request in terms of LUs are translated into parameters defining the request in the VUAs, and parameters defining the request in terms of VUAs are further translated into parameters defining the request in the VDS in terms of VDAs and further translated into physical storage addresses.

Translating addresses of data blocks in LUs into addresses (VUAs) in VUS can be provided independently from translating addresses (VDA) in VDS into the physical storage addresses. Such translation can be provided, by way of non-limiting examples, with the help of an independently managed VUS allocation table and a VDS allocation table handled in the allocation module 406. Different blocks in VUS can be associated with one and the same block in VDS, while allocation of physical storage space can be provided only responsive to destaging respective data from the cache memory to the disks (e.g. for snapshots, thin volumes, etc.).

Among advantages of independent management of VUS and VDS layers is the ability of changing a client's side configuration of the storage system (e.g. new host connections, new snapshot generations, changes in status of exported volumes, etc.), with no changes in meta-data handled in the second virtual layer and/or physical storage space.

By way of another non-limiting example, in a case of thin volume (aka thin provisioning), each block of the LU is immediately translated into a block in VUS, but the association with a block in VDS is provided only when actual physical allocation occurs, i.e., only on the first write to the corresponding physical block. In the case of thin volume, the storage system does not provide booking of available space in VDS. Thus, in contrast to a regular volume, thin volumes have no guaranteed available space in VDS and physical storage space.

FIG. 4 demonstrates two logical data units allocated to different logical addresses in VUS 420 and 421 which share the same address (423) in VDS. According to the presently disclosed subject matter, a logical address key in cache mapping table 200 can include also logical address VUAs in VUS and a physical address key in cache mapping table can include also VDAs in VDS. According to the presently disclosed subject matter logical address of cached data units can be represented with the help of virtual unit addresses in the virtual address space and physical address of cached data units can be represented with the help of virtual disk addresses (VDAs) in VDS. In some cases a data unit in cache memory 105 can be associated with both a physical storage address and a virtual disk address, while in other cases a data unit in cache memory 105 can be associated with only one of a physical storage address and a virtual disk address.

FIG. 1, described above, illustrates a general schematic of the system architecture in accordance with an embodiment of the presently disclosed subject matter. Certain embodiments of the present invention are applicable to the architecture of a computer system described with reference to FIG. 1. However, the invention is not bound by the specific architecture; equivalent and/or modified functionality may be consolidated or divided in another manner and may be implemented in any appropriate combination of software, firmware and hardware. Those versed in the art will readily appreciate that the invention is, likewise, applicable to any computer system and any storage architecture implementing a virtualized storage system. In different embodiments of the invention the functional blocks and/or parts thereof may be placed in a single or in multiple geographical locations (including duplication for high-availability). Control layer 103 in FIG. 1 comprises or is otherwise associated with at least one processor operable for executing operations as described above. The term "processor" should be expansively construed to cover any kind of electronic device with data processing capabilities, including, by way of non-limiting example, a personal computer, a server computer, a computing system, a communication device, a processor (e.g. digital signal processor (DSP), a microcontroller, a field programmable gate array (FPGA), an application specific integrated circuit (ASIC), etc.), any other electronic computing device, and or any combination thereof. Operative connections between the blocks and/or within the blocks may be implemented directly (e.g. via a bus) or indirectly, including remote connection. Connections between different components in illustrated in FIG. 1, may be provided via Wire-line, Wireless, cable, Internet, Intranet, power, satellite or other networks and/or using any appropriate communication standard, system and/or protocol and variants or evolutions thereof (as, by way of unlimited example, Ethernet, iSCSI, Fiber Channel, etc.).

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

The invention claimed is:

1. A method of avoiding duplication of data units stored in a cache memory of a storage system, the method comprising:
   (a) receiving a read request, the read request comprising information indicative of a logical address of a requested data unit;
   (b) in a case where a data unit associated with the logical address is not found in the cache memory:
      (i) obtaining a storage physical address related to a physical storage device and associated with the logical address;
      (ii) utilizing said storage physical address for searching the cache memory for a data unit associated with said storage physical address; and
      (iii) servicing the request from the cache memory in case the data unit associated with said storage physical address is found in the cache memory, without accessing the physical storage device;
   wherein the logical address indicated in the read request is different from a logical address associated with the data unit that is associated with said storage physical address and is found in the cache memory.

2. The method according to claim 1 further comprising: prior to said operation (b), searching the cache memory for the data unit associated with said logical address.

3. The method according to claim 1 wherein said physical address is obtained with the help of said logical address.

4. The method according to claim 1 wherein at least two logical data units in said storage system, each with a different logical address, have a common physical address.

5. The method according to claim 2 wherein one or more data units in said cache memory are linked to a respective logical address via a logical address key associated with the respective logical address; said logical address key enabling the search of the cache memory for the data unit associated with said logical address.

6. The method according to claim 1 wherein one or more data units in said cache are linked to a respective physical address via a physical address key; said physical address key enabling the search of the cache memory for the data unit associated with said storage physical address.

7. The method according to claim 1 further comprising:
retrieving the requested data unit from the physical storage device, in case the requested data unit is not found in the cache memory;
storing the requested data unit in the cache memory; and
updating said cache memory, to include information indicative that the requested data unit is stored in the cache memory, said information providing at least a link between the requested data unit and the storage physical address.

8. The method according to claim 7, wherein said information includes at least a physical address key linking between the requested data unit and the storage physical address of the requested data unit.

9. The method according to claim 1, further comprising:
providing a cache mapping table associated with said cache memory, said cache mapping table including information that links the data units stored in said cache memory with respective physical address and/or logical address.

10. The method according to claim 9, wherein said cache mapping table is a hash table.

11. The method according to claim 1, wherein the storage system comprises a control layer comprising a first virtual layer operable to represent the data units stored in said cache with the help of virtual unit addresses (VUAs) corresponding to respective logical addresses, and a second virtual layer operable to represent the data units stored in said cache with the help of virtual disk addresses (VDAs) mapped into addresses in at least one physical storage device; said logical address includes information indicative of a virtual unit address of at least one requested data unit; the method further comprising:
obtaining a virtual disk address associated with the virtual unit address;
searching the cache memory for a data unit associated with said virtual disk address;
servicing the request from cache in case the data unit is found in the cache memory.

12. The method according to claim 1, wherein the storage system comprises a control layer comprising a first virtual layer operable to represent the data units stored in said cache with the help of virtual unit addresses (VUAs) corresponding to respective logical addresses, and a second virtual layer operable to represent the data units stored in said cache with the help of virtual disk addresses (VDAs) mapped into addresses in at least one physical storage device; wherein said logical address includes information indicative of a virtual unit address of at least one requested data unit and said storage physical address is represented in said cache by a respective virtual disk address.

13. A storage system comprising:
a control layer operatively connected to a physical storage space including at least one storage device; said control layer comprising a cache memory operable to store data units characterized by respective physical addresses and logical address, the control layer is operable to receive a read request, the read request comprising information indicative of a logical address of a requested data unit; the control layer is further operable, in a case where a data unit associated with the logical address is not found in the cache memory: to obtain a storage physical address related to a physical storage device and associated with the logical address; utilize said storage physical address for searching the cache memory for a data unit associated with said storage physical address; and service the request from the cache memory in case the data unit associated with said storage physical address is found in the cache memory, without accessing the physical storage device; wherein the logical address indicated in the read request is different from a logical address associated with the data unit that is associated with said storage physical address and is found in the cache memory.

14. The storage system according to claim 13, wherein said control layer is further operable, prior to obtaining a storage physical address associated with the logical address, to search the cache memory for the data unit associated with said logical address.

15. The storage system according to claim 13 wherein said control layer is operable to obtain said physical address with the help of said logical address.

16. The storage system according to claim 13 wherein at least two logical data units in said storage system, each with a different logical address, have a common physical address.

17. The storage system according to claim 14, wherein said control layer is operable to link one or more of said data units in said cache memory to a respective logical address via a logical address key associated with the respective logical address; said logical address key enabling the search of the cache memory for the data unit associated with said logical address.

18. The storage system according to claim 13, wherein said control layer is operable to link one or more of said data units in said cache to a respective physical address via a physical address key; said physical address key enabling the search of the cache memory for the data unit associated with said storage physical address.

19. The storage system according to claim 13, wherein said control layer is further operable to retrieve the requested data unit from the physical storage device, in case the requested data unit is not found in the cache memory; store the requested data unit in the cache memory; and update said cache memory, to include information indicative that the requested data unit is stored in the cache memory, said information providing at least a link between the requested data unit and a respective storage physical address.

20. The storage system according to claim 19, wherein said information includes at least a physical address key linking between the requested data unit and the storage physical address of the requested data unit.

21. The storage system according to claim 13, wherein said control layer is further operable to manage a cache mapping table associated with said cache memory, said cache mapping table including information that links the data units stored in said cache memory with respective physical address and/or logical address.

22. The storage system according to claim 21, wherein said cache mapping table is a hash table.

23. The storage system according to claim 13, wherein said control layer is operable to provide a first virtual layer representing the data units stored in said cache with the help of virtual unit addresses (VUAs) corresponding to respective logical addresses, and a second virtual layer representing the data units stored in said cache with the help of virtual disk addresses (VDAs) mapped into addresses in at least one physical storage device; said logical address includes information indicative of a virtual unit address of at least one requested data unit; the control layer is further operable to obtain a virtual disk address associated with the virtual unit address; search the cache memory for a data unit associated with said virtual disk address; and service the request from cache in case the data unit is found in the cache memory.

24. The storage system according to claim 13, wherein the storage system comprises a control layer comprising a first virtual layer operable to represent the data units stored in said cache with the help of virtual unit addresses (VUAs) corresponding to respective logical addresses, and a second virtual layer operable to represent the data units stored in said cache with the help of virtual disk addresses (VDAs) mapped into addresses in at least one physical storage device; wherein said logical address includes information indicative of a virtual unit address of at least one requested data unit and said storage physical address is represented in said cache by a respective virtual disk address.

25. A non-transitory computer readable medium storing a computer readable program executable by a computer for causing the computer to perform a process of avoiding duplication of data units stored in a cache memory of a storage system, the method comprising:
 a. receiving a read request, the read request comprising information indicative of a logical address of a requested data unit;
 (b) in a case where a data unit associated with the logical address is not found in the cache memory:
  i. obtaining a storage physical address related to a physical storage device and associated with the logical address;
  ii. utilizing said storage physical address for searching the cache memory for a data unit associated with said storage physical address; and
  iii. servicing the request from the cache memory in case the data unit associated with said storage physical address is found in the cache memory; without accessing the physical storage device;
 wherein the logical address indicated in the read request is different from a logical address associated with the data unit that is associated with said storage physical address and is found in the cache memory.

26. A cache manager implemented on a non-transitory computer memory, operatively connectable to a storage system, the storage system comprising a cache memory operable to store data units, the cache manager is operable to:
 receive information indicative of a logical address of a requested data unit; in a case where a data unit associated with the logical address is not found in the cache memory, the cache manager is further operable to: receive data indicative of a storage physical address related to a physical storage device and associated with the logical address; utilize said storage physical address for searching the cache memory for a data unit associated with said storage physical address; and provide the at least one requested data unit from the cache memory in case the data unit associated with said storage physical address is found in the cache memory, without accessing the physical storage device; wherein the logical address indicated in the read request is different from a logical address associated with the data unit found in the cache memory.

* * * * *